United States Patent [19]

Eastmond

[11] 3,824,470

[45] July 16, 1974

[54] COMMUNICATIONS SYSTEM AND METHOD FOR TRANSMITTING OVER A LIMITED BANDWIDTH TRANSMISSION LINK

[75] Inventor: Bruce C. Eastmond, Darien, Ill.

[73] Assignee: Motorola Inc., Franklin Park, Ill.

[22] Filed: Feb. 20, 1973

[21] Appl. No.: 333,601

[52] U.S. Cl. .................... 325/45, 325/61, 179/84 R

[51] Int. Cl. .................... H04b 3/06

[58] Field of Search .................... 333/14, 16, 17, 45; 325/59, 61, 62, 64, 308, 309; 179/84 R, 84 V, 84 S, 2 R, 2.5 B, 2.5 R, 15.55

[56] References Cited

UNITED STATES PATENTS

| | | | |
|---|---|---|---|
| 2,065,826 | 12/1936 | Roosenstein et al. | 325/62 |
| 3,377,559 | 4/1968 | Stewart | 325/62 X |
| 3,517,313 | 6/1970 | Vasile | 325/61 X |
| 3,684,823 | 8/1972 | McVoy | 325/308 UX |

*Primary Examiner*—Benedict V. Safourek

*Attorney, Agent, or Firm*—Eugene A. Parsons; Vincent Rauner

[57] ABSTRACT

A communications system, including portable transmitters and several remote receivers connected to a base station by means of a limited bandwidth transmission link (such as a telephone line), wherein the receivers include an encoder for transmitting the information over the transmission link and removing a small band of the information and inserting a carrier frequency, amplitude and frequency modulated by the coded squelch signals and the information signal strength signals, and the base station includes a decoder.

17 Claims, 2 Drawing Figures

COMMUNICATIONS SYSTEM AND METHOD FOR TRANSMITTING OVER A LIMITED BANDWIDTH TRANSMISSION LINK

BACKGROUND OF THE INVENTION

1. Field of Invention

The present communications system pertains to a community type repeater system consisting of a base station and two or more remote receivers located throughout the intended service area, which receivers are connected to the base station by means of limited bandwidth transmission links, such as telephone lines. Low power portable or mobile transmitters may then communicate with each other by transmitting to the nearest receiver and, through that receiver, gaining access to the base station for transmission to another desired portable or mobile unit. Each receiver sends an indication of received signal strength to a comparator at the base station so that the receiver receiving the best signal may be used by the portable or mobile transmitter. In addition, the portable transmitters transmit coded squelch signals for communicating with other portable units having the same coded squelch.

When the transmission link is, for example, telephone lines the bandwidth is from approximately 3,000 Hz to 300 Hz. In most communications systems the coded squelch signals are in the range of from 300 to 0 Hz. Therefore, the transmission link passes the information signals but cannot pass the coded squelch signals.

2. Description of the Prior Art

In prior art systems the coded squelch signals may be utilized to modulate a carrier frequency in the bandwidth of the transmission link but outside the frequency of the information signals, or a special transmission link capable of passing the low frequency signals was utilized. In systems requiring the indication of received signal strength, signals representative of information signal strength are multiplexed with the information signals in an attempt to transmit all of the information within the limited bandwidth of the transmission link. However, all of the conventional techniques for multiplexing two signals involve problems, such as additional use of the spectrum, complicated and costly equipment, difficult and/or poor operation, etc.

SUMMARY OF THE INVENTION

The present invention pertains to a communications system wherein a receiver receives information signals and coded squelch signals from a remote transmitter and transmits these signals to a base station through a limited bandwidth transmission link by removing a narrow band of the information signal and inserting therein a carrier frequency which is amplitude and frequency modulated by the coded squelch signals and information signal strength signals. The modulating signals are limited and shaped to reduce the bandwidth of the modulated carrier frequency.

It is an object of the present invention to provide an improved communications system utilizing a limited bandwidth transmission link between receivers and a base station.

It is a further object of the present invention to provide a communications system wherein information signals, coded squelch signals and information signal strength signals can be transmitted over a limited bandwidth transmission link with a minimum of information loss and relatively simple equipment.

These and other objects of this invention will become apparent to those skilled in the art upon consideration of the accompanying specification, claims and drawings.

BRIEF DESCRIPTION OF THE DRAWINGS

Referring to the drawings.

DESCRIPTION OF THE PREFERRED EMBODIMENT

Figure 1:
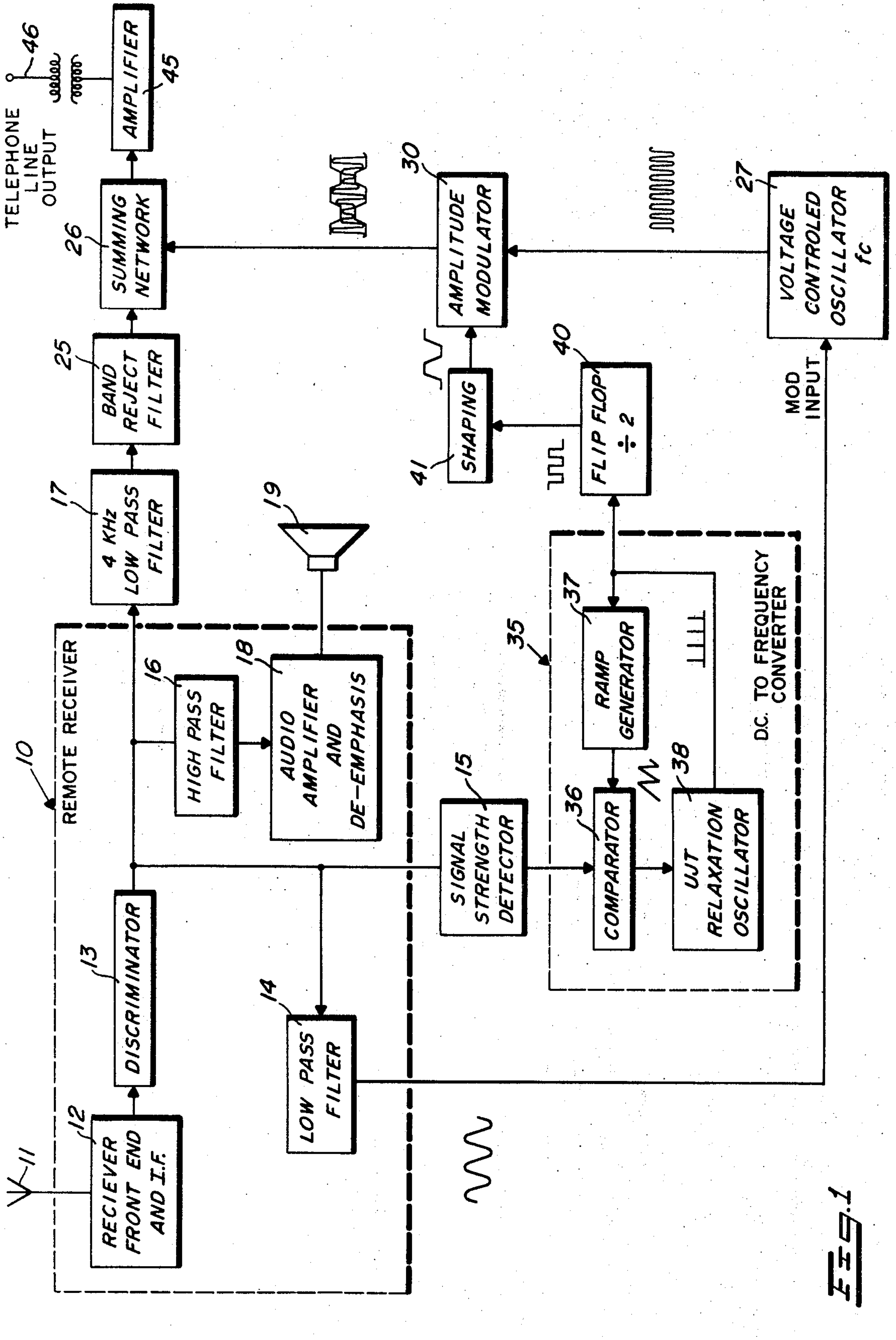
FIG. 1 is a block diagram of communications receiver embodying an encoder constructed in accordance with the present invention.

Referring to FIG. 1, a remote receiver generally designated 10 includes an antenna 11 connected to a receiver front end and IF strip 12. The antenna 11 and receiver front end and IF strip 12 are designed to receive information signals and coded squelch signals from transmitters, such as portable or mobile transmitters. The coded squelch signals, as is well known in the art, are designed to allow communications between specific units of the system and eliminate signals from all other units. The output of the front end and IF strip 12 is connected to a discriminator 13 the output of which is connected to a low pass filter 14, a signal strength detector 15 (external of the remote receiver 10), a high pass filter 16 and a 4 KHz low pass filter 17 (external of the remote receiver 10). The high pass filter 16 is connected to an audio amp and de-emphasis circuit 18, the output of which is audio and is applied to a transducer, such as speaker 19.

The external 4 KHz low pass filter 17 is connected to a bank reject filter 25 the output of which is applied to a summing network 26. The low pass filter 14 in the remote receiver 10 is connected externally to a voltage controlled oscillator 27, which oscillator is tuned to a desired carrier frequency $F_c$. The output of the low pass filter 14 frequency modulates the carrier frequency $F_c$ from the oscillator 27. The output of the oscillator 27 is applied to an amplitude modulator 30.

The output of the signal strength detector 15 is applied to a DC to frequency converter, generally designated 35. The converter 35 includes a comparator 36 having a first input connected to the output of the signal strength detector 15 and a second input connected to a ramp generator 37. The output of the comparator 36 is connected to a relaxation oscillator 38, the output of which is connected to the input of the ramp generator 37 and to an external divide by two flip-flop or binary circuit 40. The output of the flip-flop 40 is connected through a shaping circuit 41 to the amplitude modulator circuit 30 for modulating the carrier frequency from the oscillator 27. The output of the amplitude modulator circuit 30 is applied to the summing circuit 26. The output of the summing circuit 26 is amplified in an amplifying circuit 45 and coupled to a limited bandwidth transmission link, such as the telephone line 46.

In the operation of the remote receiver and encoder illustrated in FIG. 1, information signals and coded squelch signals are received at the antenna 11 and processed in the normal manner in the receiver front end and IF strip 12. The information signals, which commonly may be audio, are detected in the discriminator 13 and applied to the high pass filter 16 and 4 KHz low pass filter 17. The high pass filter 16 passes only the information, or in this case audio signals, lying in a range which may be, for example, approximately 300 to 3,000 Hz. The audio signals are amplified and de-emphasized in the normal manner in circuit 18 and then applied to the speaker 19 if it is desired that the portable communicate with someone at the remote receiver 10. In many instances the operators of the portable radios will simply be communicating with each other and the filter 16, amplifier and de-emphasis circuit 18 and speaker 19 may be eliminated.

The audio signals are also applied to the 4 KHz low pass filter 17 which removes high frequency noise from the audio to reduce excessive telephone line cross-talk in the transmission link. The band reject filter 25 removes a small band of the audio information, generally near the upper end of the range of frequencies of the information (which may be, for example, approximately 2,200 Hz to 2,600 Hz), so that audio components in this band will not interfere with the amplitude and frequency modulated carrier frequency, $F_c$, to be explained presently. It has been found that eliminating a small band or notch of information in the upper frequencies of voice information has a small effect on the overall information transmitted.

The signals at the output of the discriminator 13 are also applied to the low pass filter 14 which passes all frequencies below approximately 300 Hz. Thus, the information or audio signals are rejected and only the coded squelch signals pass therethrough. The coded squelch signals passing through the low pass filter 14 are applied to the oscillating means, which is this embodiment is a voltage controlled oscillator 27, to control the frequency thereof. By controlling the frequency of the oscillator 27 about the normal carrier frequency, $F_c$, in accordance with the coded squelch signals, the output of the oscillator 27 is frequency modulated. The level of the coded squelch signal applied to the oscillator 27 is adjusted so that the signal will deviate the frequency of the oscillator 27 in a manner to render the second or higher order sidebands of the oscillator 27 insignificant when compared to the first order sidebands. Under these conditions the frequency modulated signals produced by the oscillator 27 occupy a minimum of bandwidth and can be band limited in the decoder at the base station (to be described presently) without introducing appreciable amplitude modulation therein. The specific manner and amount of adjustment to the coded squelch signal level will depend upon the specific circuitry utilized and will be readily discernible by those skilled in the art.

The signal strength detector 15, which may be a circuit similar to those used in carrier squelch circuits, is connected to the discriminator 13, or the output thereof, to determine the strength of the information signal. The signal strength detector 15 can measure the strength of the information signal by measuring the noise at some frequency above the information band, 4,500 Hz to 5,000 Hz for example, as in the illustrated embodiment and, as is known in the art, this noise is indirectly proportional to the signal strength. Alternately, the signal strength can be measured by measuring the amplitude of the information signal in the receiver front end and IF 12. The signal strength detector 15 then provides an analog signal representative of the information signal strength. The analog signal from the signal strength detector 15 is applied to one input of the comparator 36 and the level thereof is compared to the linearly increasing level of a ramp from the ramp generator 37. When the amplitude of the ramp from the ramp generator 37 equals the amplitude of the signal from the signal strength detector 15 the relaxation oscillator 38 is triggered to provide a pulse at the output thereof. In the present embodiment the relaxation oscillator 38 is the well known unijunction transistor type which provides a relatively sharp pulse at the output when the comparator 36 applies an input signal. The pulses from the relaxation oscillator 38 are applied to the ramp generator 37 to generate a ramp at the output thereof for each pulse applied at the input. Thus, the frequency of the pulses supplied by the relaxation oscillator 38 are proportional to the DC voltage applied to the comparator 36 from the signal strength detector 15.

The pulses from the relaxation oscillator 38 are also applied to the binary or flip-flop circuit 40 which provides a square wave at the output of each two pulses applied to the input thereof. Thus, each transition of the square wave at the output of the flip-flop 40 is representative of a pulse at the output of the relaxation oscillator 38. In this manner the repetition rate of the signal is divided by two which minimizes the required transmission bandwidth. The square wave from the flip-flop 40 is applied to the shaping circuit 41 which generates a trapezoidal waveform with substantially lower harmonic content than the square wave. The trapezoidal waveform is applied to an input of the amplitude modulator 30 and utilized to amplitude modulate the carrier frequency produced by the oscillator 27. The amplitude modulation of the carrier frequency should be controlled to allow continuous transmission of the carrier frequency, i.e., something less than 100 percent modulation and generally approximately 50 percent modulation to provide substantial amounts of the carrier frequency for later demodulation. If the wave shaping and amount of modulation in the amplitude modulator 30 and the amount of deviation in the oscillator 27 are carefully controlled the resultant spectrum of the AM/FM signal will be sufficiently contained so that no clean-up bandpass filter will be necessary between the modulator 30 and the summing network 26.

The AM/FM signal is applied to the summing network 26 so as to be transmitted in the notch in the information signal produced by the band reject filter 25. The composite signal from the summing network 26 is applied to amplifier 45 to provide it with the necessary signal strength and is coupled to the transmission link, which in this embodiment is the telephone line 46. The telephone line 46 transmits the composite signal to a decoder at the base station, illustrated in block form in FIG. 2.

Figure 2:
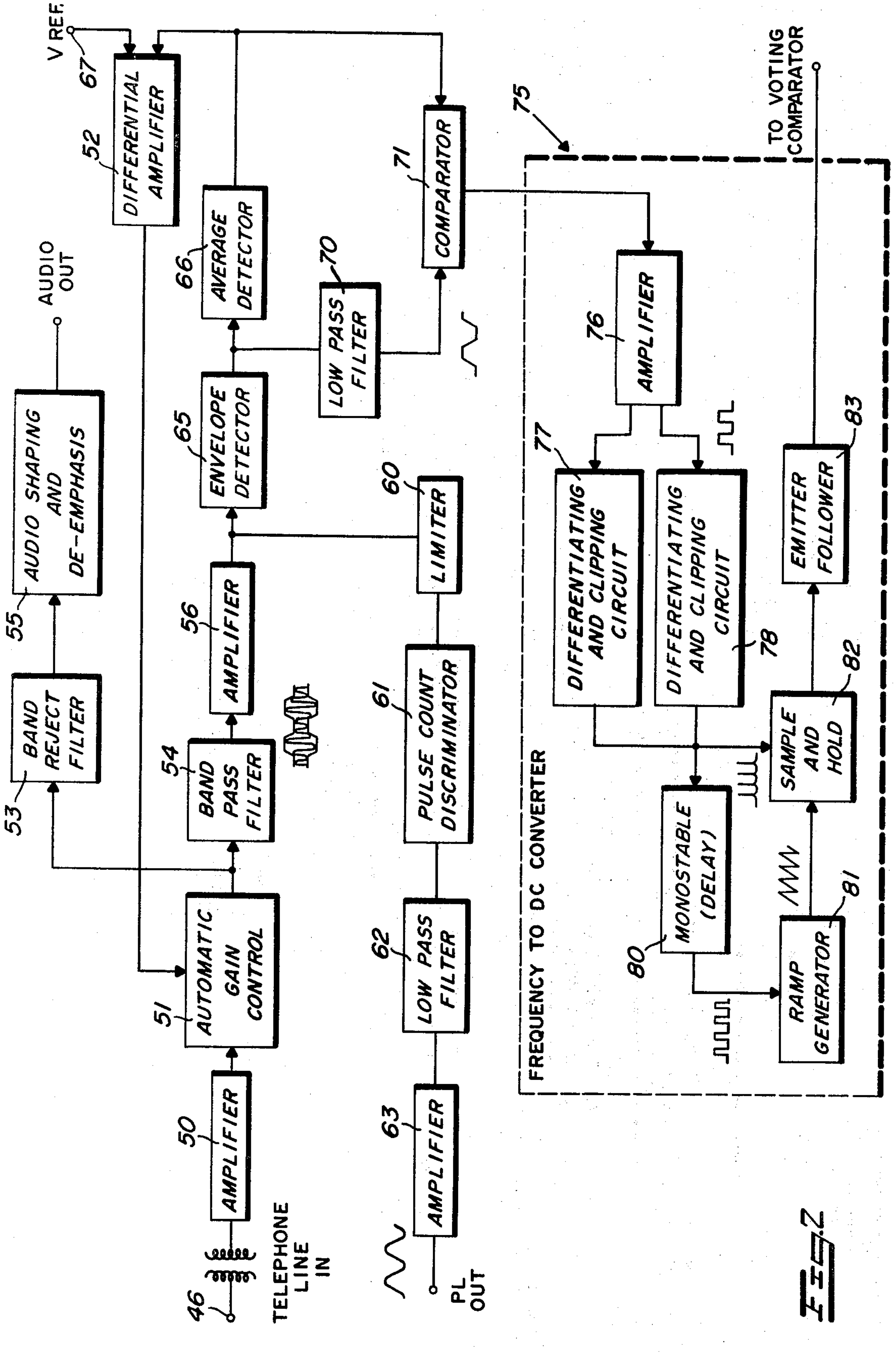
FIG. 2 is a block diagram of a base station connected to the receiver of FIG. 1 by means of a limited bandwidth transmission link and embodying a decoder constructed in accordance with the present invention.

Referring to FIG. 2, the composite signal including the information signal with the amplitude and frequency modulated carrier frequency interspersed in a notch thereof is transmitted over the telephone line 46 to an amplifier 50 located at the base station. The output of the amplifier 50 is applied to an AGC (automatic gain control) circuit 51. The AGC circuit 51 has a second or control input connected to comparator means, which in this embodiment is a differential amplifier 52, and an output connected to a band reject filter 53 and a bandpass filter 54. The band reject filter 53 is tuned to reject the amplitude and frequency modulated carrier frequency so that only the information signal is passed therethrough. The information signals, which in this embodiment are audio signals, are applied to an audio shaping and deemphasis circuit 55 which then applies the audio signals to output circuits (not shown).

The bandpass filter 54 is tuned to pass the amplitude and frequency modulated carrier and the output thereof is connected to an amplifier 56 which provides the desired level of signal for further operations. The output of the amplifier 56 is connected to a limiter 60 that substantially removes amplitude variations in the signal and supplies the frequency modulated carrier to FM detector means, which in this embodiment is a pulse count discriminator 61. The pulse count discriminator 61 converts the frequency modulated carrier to the original modulating signal, which in this embodiment is a subaudible tone utilized for identification purposes, and supplies the modulating signal of subaudible tone to a low pass filter 62. Low pass filter 62 is tuned to pass only the signals within a predesignated range and to eliminate noise, harmonics, etc. The signal passing through low pass filter 62 is applied to an amplifier 63, which gives the signal a required level for operating subsequent squelch circuits (not shown). It should be understood that other types of FM detecting circuits might be utilized and that such additional circuits, such as low pass filter 62 and amplifier 63 may be incorporated in other circuitry or eliminated by redesign of other circuit components.

The output of the amplifier 56 is also supplied to an AM detector, which in this embodiment is envelope detector 65. The output signal from the envelope detector 65, which is a trapezoidal wave varying in duration in accordance with the information signal strength, is applied to an average detector 66, which provides a DC signal varying in accordance with the average amplitude of the trapezoidal signal applied thereto. The average value of the amplitude of the trapezoidal signal varies about some DC reference, such as zero. This varying average signal is applied to an input of the differential amplifier 52. A reference voltage is applied to a second input 67 of the differential amplifier 52 from a source (not shown) and the differential amplifier 52 provides a control voltage to the AGC circuit 51 which is a function of the difference between the average signal from the average detector 66 and the reference voltage at the terminal 67. Thus, as various factors and components in the system change, such as changes in the gain of the telephone line 46 due to temperature changes, etc., tube aging, and other component aging, the level of the information or audio output from the unit will remain constant.

The trapezoidal wave from the envelope detector 65 is also applied through a low pass filter 70, which removes unwanted noise, harmonics and the like, to one input of a comparator circuit 71. The varying average signal from the average detector 66 is also applied to a second input of the comparator 71. The comparator 71 is essentially a zero crossing detector which provides a square wave at the output with a transition each time the trapezoidal wave crosses the average signal. Thus, the comparator 71 provides an accurate indication of the transitions of the trapezoidal signal from the low pass filter 70, regardless of the non-linearities of the trapezoidal signal. The square wave output from the comparator 71 is applied to a frequency to DC converter, generally designated 75. While a specific frequency to DC converter 75 is disclosed, it should be understood that substantially any frequency to DC converter which can perform the functions of the apparatus might be utilized.

The square wave from the comparator 71 is applied to an amplifier 76 in the frequency to DC converter 75. The amplifier 76 may be a differential amplifier, a phase splitter amplifier, or any circuit which provides two balanced outputs 18. percent out of phase in response to an input. The two outputs from the amplifier 76 are applied to differentiating and clipping circuits 77 and 78, respectively. The differentiating and clipping circuits 77 and 78 each provide a series of sharp positive pulses corresponding to the positive transitions of the square waves applied thereto and the negative pulses are clipped or removed from the signal. The sharp positive pulses from each of the differentiating and clipping circuits 77 and 78 are added together to provide a signal having twice the frequency of the repetition rate of the square wave supplied by the comparator 71, which frequency is equal to the frequency of the pulses from the oscillator 38 in the encoder of FIG. 1.

The series of sharp pulses from the differentiating and clipping circuits 77 and 78 are supplied to trigger a monostable multivibrator circuit 80. The monostable multivibrator circuit 80 produces a pulse having a duration much shorter than the shortest time expected between transitions of the square wave from the comparator 71. The pulses from the multivibrator circuit 80 are applied to a ramp generator 81 which is reset to zero by the trailing edge of each pulse from the multivibrator circuit 80. After the ramp generator 81 is reset to zero a linearly increasing ramp voltage is again produced at the output, which ramp voltage is supplied to a sample and hold circuit 82. The series of sharp positive pulses from the differentiating and clipping circuits 77 and 78 are also applied to the sample and hold circuit 82 and cause the circuit 82 to sample the ramp voltage each time one of the positive pulses is applied. Thus, a positive pulse causes the circuit 82 to sample the ramp voltage applied thereto and, simultaneously, triggers the multivibrator circuit 80 to produce a pulse which resets the ramp generator 81 to zero a short time after the positive pulse causes the circuit 82 to sample the ramp. Each time a sample is taken in the circuit 82 the sampled voltage is stored or held until the next sample is taken. The sample and hold circuit provides a signal to an emitter follower 83, the output of which is a DC voltage directly related to the voltage from the noise module 15 in the encoder of FIG. 1. This DC voltage is an indication of the information signal strength and is utilized in comparator circuits (not shown) which energize the remote receiver closest to or in best radio contact with the portable transmitter being received.

Thus, a communications system is disclosed wherein several remote receivers are connected to a base station by means of a limited bandwidth transmission link, such as a telephone line, and information signals having a bandwidth substantially equal to the transmission link may be transmitted over the link along with coded squelch signals and signals designating information signal strength. It should be understood of course that the frequency and amplitude modulated carrier frequency could be trnasmitted outside of the bandwidth of the information signals but still within the bandwidth of the transmission link. Further, the specific embodiment of the system disclosed is designed for transmitting audio information over telephone lines and subaudible coded squelch signals and it should be understood that many of the filters and other circuitry are designed for these particular frequencies. Some of the filters and other circuitry might be eliminated and/or altered in operation if the transmission link and the frequency of the signals differs from the disclosed embodiment. Further modifications and improvements will occur to those skilled in the art and I desire it to be understood, therefore, that this invention is not limited to the particular form shown and I intend in the appended claims to cover all modifications which do not depart from the spirit and scope of this invention.

I claim:

1. A communications receiver for use in a communications system including a base station, connected to said receiver by a limited bandwidth transmission link, and at least one remote transmitter for providing information signals lying within the limited bandwidth of the transmission link and coded squelch signals at a frequency different than the information signals, said receiver comprising:

a. receiving means for receiving and amplifying signals from the portable transmitter;
b. means connected to said receiving means for passing at least the information signals in the received signals to an output;
c. bandpass filter means connected to the receiving means for passing the coded squelch signals contained in the signals received by said receiving means;
d. signal strength indicating means connected to the receiving means for providing a signal indicative of the signal strength of the information signals in said receiving means;
e. oscillator means providing a carrier frequency lying within the limited bandwidth of the transmission link and including means for frequency and amplitude modulating the carrier frequency;
f. means connecting said bandpass filter means and said signal strength indicating means to said oscillator means for frequency modulating the carrier frequency in accordance with one of the information signals and the signal strength indicating signal and for amplitude modulating the carrier frequency in accordance with the other of the information signals and the signal strength indicating signal; and
g. means connected to said means for passing the information signals and said oscillator means for coupling the information signals and the frequency and amplitude modulated carrier frequency to the transmission link.

2. A communications receiver as claimed in claim 1 wherein the carrier frequency lies within the range of frequencies of the information signals and the means connected to said receiving means for passing the information signals includes band reject filter means for removing information signals at frequencies approximately equal to the frequencies of the frequency and amplitude modulated carrier frequency.

3. A communications receiver as claimed in claim 1 wherein the transmission link includes telephone lines and the means connected to said receiving means for passing the information signals includes a low pass filter capable of passing frequencies below approximately 3 KHz.

4. A communications receiver as claimed in claim 3 wherein the coded squelch signals are in a range below approximately 300 Hz and the bandpass filter means includes a low pass filter capable of passing frequencies in the range.

5. A communications receiver as claimed in claim 1 wherein the oscillator means includes a voltage controlled oscillator having an input for controlling the frequency of said oscillator in accordance with variations of a voltage applied to the input.

6. A communications receiver as claimed in claim 5 wherein the bandpass filter means is connected to the input of the voltage controlled oscillator for varying the frequency of said oscillator in accordance with coded squelch signals.

7. A communications receiver as claimed in claim 1 wherein the connecting means includes means for converting a DC signal to pulses having a frequency proportional to the amplitude of said DC signal.

8. A communications receiver as claimed in claim 7 wherein the connecting means further includes a bistable circuit connected to receive the pulses from the converting means for converting the pulses to a square wave having a repetition rate one half the frequency of the pulses.

9. A communications receiver as claimed in claim 8 wherein the connecting means further includes wave shaping circuitry connected to receive the square wave from the bistable circuit for generating a wave having the same repetition rate but a substantially lower harmonic content than a square wave, said wave shaping circuitry being connected to the oscillator means for amplitude modulating the carrier frequency therefrom.

10. A communications system utilizing a limited bandwidth transmission link comprising:

a. a communications receiver providing information signals and a carrier frequency amplitude and frequency modulated by coded squelch signals and signals indicative of information signal strength at said receiver, said information signals and modulated carrier frequency lying within the limited bandwidth of the transmission link;
b. a base station coupled to said communications receiver by means of the transmission link for receiving the information signals and the modulated carrier frequency, said base station including
   1. automatic gain control means having a first input connected to receive the informaton signals and the modulated carrier frequency, a second input for controlling the gain of said means in response to a signal applied to said second input, and an output,
   2. first filter means coupled to the output of said gain control means for passing the information signals and rejecting substantially all other signals from said gain control means,
   3. frequency demodulator means coupled to the output of said gain control means for receiving the modulated carrier frequency and demodulating the frequency variations thereof, 4. amplitude demodulator means coupled to the output of said gain control means for receiving the modulated carrier frequency and demodulating the amplitude variations thereof,
5. averaging means connected to said amplitude demodulator means for providing an average signal in response to the demodulated amplitude variations of the carrier frequency,
6. reference means providing a reference voltage of an amplitude sufficient to maintain the gain control means at a desired value, and
7. comparing means having a first input connected to receive the average signal from said averaging means, a second input having the reference voltage applied thereto from said reference means, and an output coupled to the second input of said gain control means for adjusting said gain control means in accordance with the value of the average signal with respect to the reference voltage.

11. A communications system as claimed in claim 10 wherein the amplitude variations of the carrier frequency include a wave having relatively low harmonic content, the amplitude demodulator means of the system including envelope detector means and second comparing means having two inputs and an output with one of said inputs coupled to said envelope detector means for receiving the low harmonic wave therefrom and the other of said inputs coupled to said averaging means for providing a reference DC signal and indicating the crossing thereof by the low harmonic wave in the form of a square wave at the output.

12. A communications system as claimed in claim 11 having in addition means attached to the output of the second comparing means for converting the square wave output to a wave having twice the repetition rate of the square wave and means attached to the doubling means for converting the output wave to a DC signal representative of one of the information signal strength signal and coded squelch signals.

13. A method of transmitting information signals, coded squelch signals and information signal strength signals over a transmission link having a bandwidth approximately equal to the bandwidth of the information signal, including the steps of:

a. passing the information signal through a band reject filter to form a notch in the bandwidth having substantially no signals;
b. providing a carrier frequency lying within the notch in the bandwidth;
c. amplitude and frequency modulating said carrier frequency in accordance with the coded squelch signals and the information signal strength signals; and
d. mixing the amplitude and frequency modulated carrier frequency with the information signals and applying them to the transmission link.

14. A method as claimed in claim 13 including in addition the steps of receiving the information signals and coded squelch signals from a remote transmitter and developing an information signal strength signal upon reception of the information signals.

15. A method as claimed in claim 13 including in addition the step of limiting the amplitude modulation to allow continuous transmission of the carrier frequency.

16. A method as claimed in claim 13 wherein the deviation of the signal frequency modulating the carrier frequency is limited so that second and third order sidebands of the carrier frequency are insignificant.

17. A method as claimed in claim 13 wherein the coded squelch signals are used to frequency modulate the carrier frequency and the information signal strength signals are used to amplitude modulate the carrier frequency.

* * * * *